United States Patent

[11] 3,596,063

[72] Inventors Terry W. Curtis;
Robert D. Keillor; Donald L. Mehaffey, all of Rochester, Minn.

[21] Appl. No. 790,650
[22] Filed Jan. 13, 1969
[45] Patented July 27, 1971
[73] Assignee International Business Machines Corportaion
Armonk, N.Y.

[54] APPARATUS FOR READING MARKS ON DOCUMENTS
5 Claims, 10 Drawing Figs.

[52] U.S. Cl. .......... 235/61.11 F
[51] Int. Cl. .......... G06k 9/00
[50] Field of Search .......... 235/61.11, 61.115; 250/219; 340/146.3

[56] References Cited

UNITED STATES PATENTS

| | | | |
|---|---|---|---|
| 3,201,569 | 8/1965 | Conron .......... | 235/61.7 |
| 3,243,776 | 3/1966 | Abbott, Jr. et al. .......... | 235/61.11 X |

*Primary Examiner*—Daryl W. Cook
*Attorney*—Sughrue, Rothwell, Mion, Zinn and Macpeak

ABSTRACT: An apparatus and method for optically reading marks on a document. A first portion of each mark area is scanned during a first scan and a second portion of each mark area is scanned during a second scan. On the first scan, latches are set for positions where the video output is above a predetermined minimum. During the second scan, a second series of latches are set if the video output is above a predetermined minimum and the corresponding first scan latches are set. An output is provided only when the second latches are set.

INVENTORS
TERRY W. CURTIS
ROBERT D. KEILLOR
DONALD L. MEHAFFEY
BY
Sughrue, Rothwell, Mion, Zinn & Macpeak
ATTORNEYS

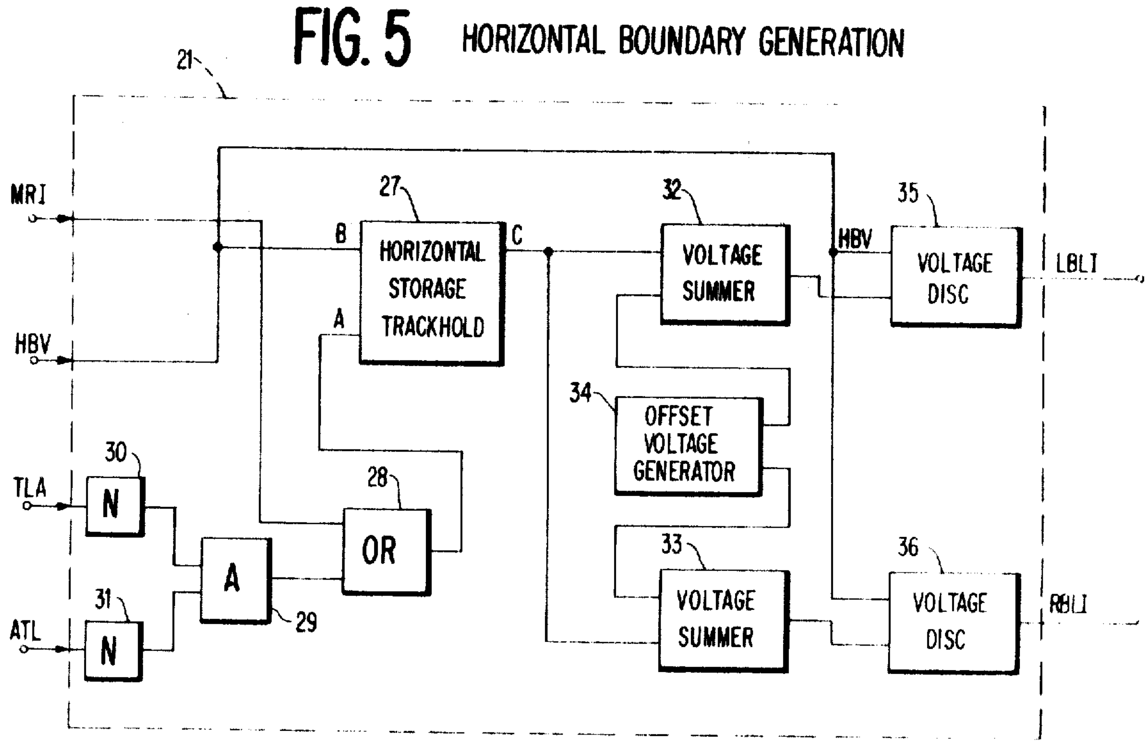
FIG. 5 HORIZONTAL BOUNDARY GENERATION
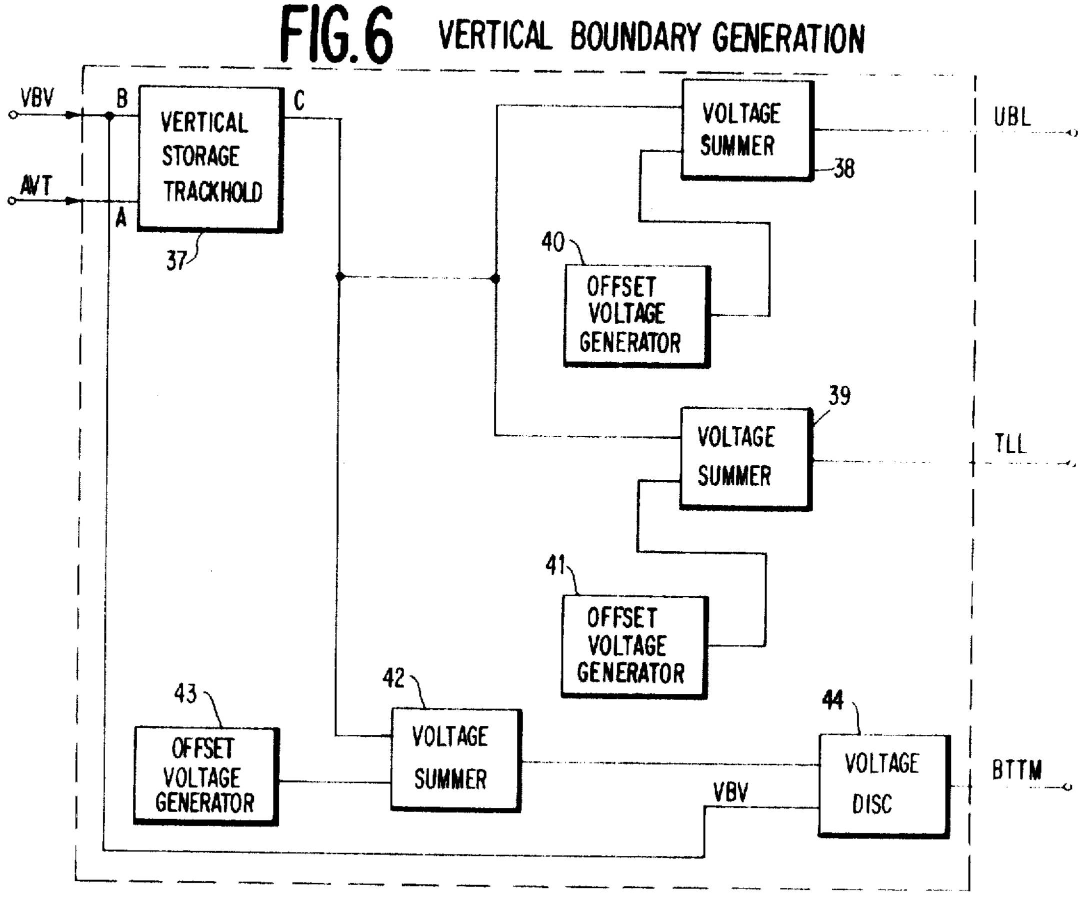
FIG. 6 VERTICAL BOUNDARY GENERATION FIG. 7 HORIZONTAL SCAN
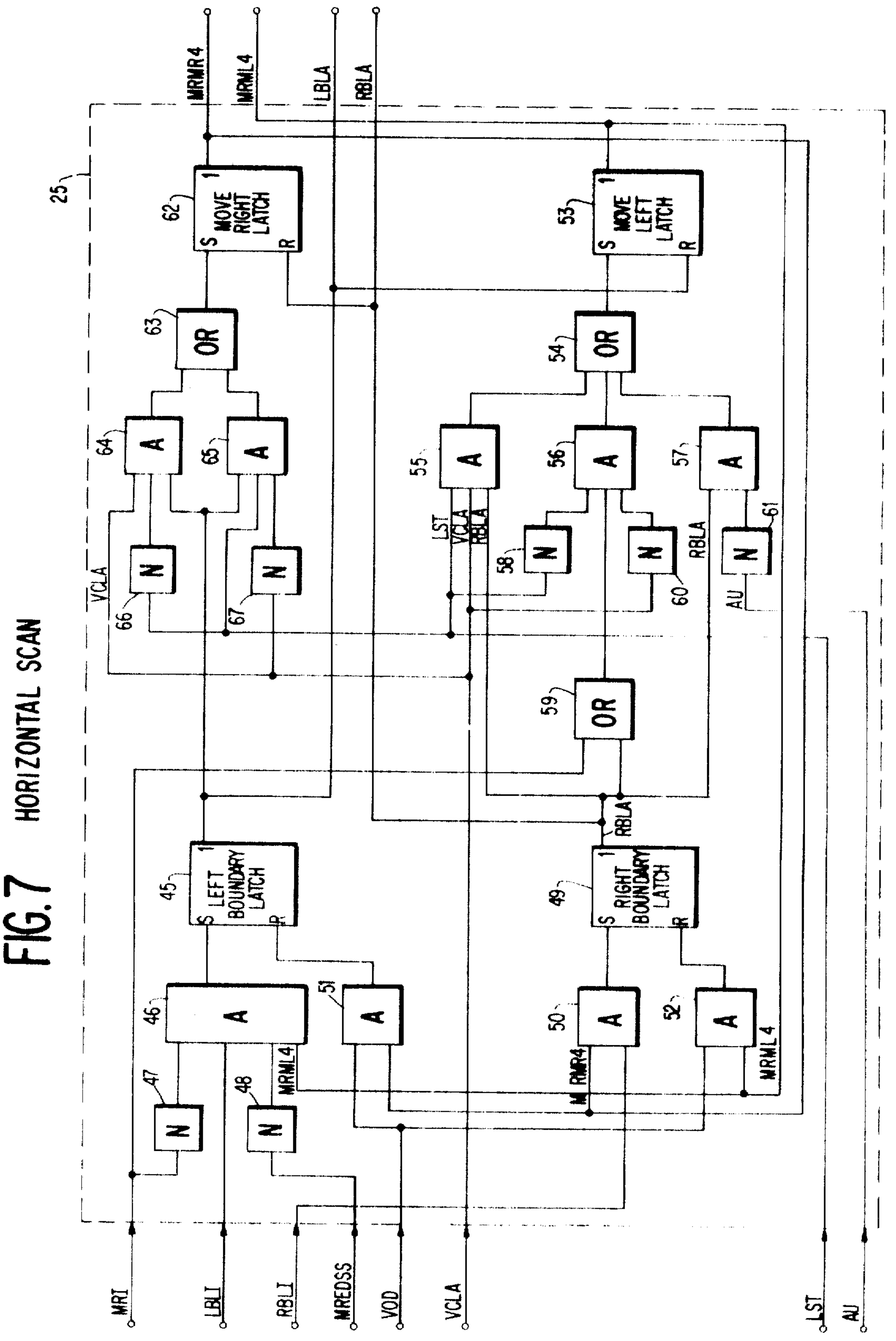

FIG. 9 VERTICAL SCAN

APPARATUS FOR READING MARKS ON DOCUMENTS

CROSS-REFERENCES TO RELATED APPLICATION

The following pending application, assigned to the assignee of the present application is incorporated by reference in the present application: Ser. No. 743,128, filed July 8, 1968, for "Mark Read Using Small Raster," by Paul E. Nelson.

BACKGROUND OF THE INVENTION

1. Field of the Invention

The invention is in the field of optical mark readers for reading marks on a document. More particularly, the invention relates to an improved means and method for eliminating noise which causes mark recognition errors.

2. Description of the Prior Art

It is known in the prior art to provide optical sensing systems which sense the presence or absence of marks in mark areas on a document. In such systems, the optical beam is deflected across a mark area, causing a video output if the beam encounters a mark during its excursion. A partially erased mark or smudges or extraneous ink splatter in mark areas will generate noise which will be erroneously read as marks. Some prior art optical mark-reading systems have tried to avoid such errors. For example, in one prior art method, each mark area is scanned twice. The first scan establishes a clipping level based on the maximum video encountered. An output is provided on the second scan only if marks encountered are above the clipping level. This arrangement has not, however, proved to be entirely satisfactory. In the prior art optical readers the same portion of each mark area is scaned during both the first and second scans. If a thin mark or extraneous ink splatter existed in only a portion of the mark area, it might be read on both the first and second scans and thus cause a recognition error.

SUMMARY OF THE INVENTION

In accordance with the present invention, an improved system is provided for optically reading marks on a document having a plurality of mark areas whereby smudges, extraneous ink splatter or other sources of noise in a mark area are ignored. Improved noise rejection is achieved by scanning a first portion of each mark area during a first scan and a second portion during a second scan. The locations of marks providing a video output above a predetermined minimum are stored during the first scan. An output is provided during the second scan for mark areas producing video signals above a predetermined minimum only if a video output above a predetermined minimum was sensed for those mark areas during the first scan.

BRIEF DESCRIPTION OF THE DRAWINGS

FIG. 5 is a logic block diagram of the horizontal boundary generation circuitry of FIG. 4.

FIG. 6 is a logic block diagram of the vertical boundary generation circuitry of FIG. 4.

FIG. 7 is a logic block diagram of the horizontal scan circuitry of FIG. 4.

DETAILED DESCRIPTION OF THE DRAWINGS

Figures 1, 2:
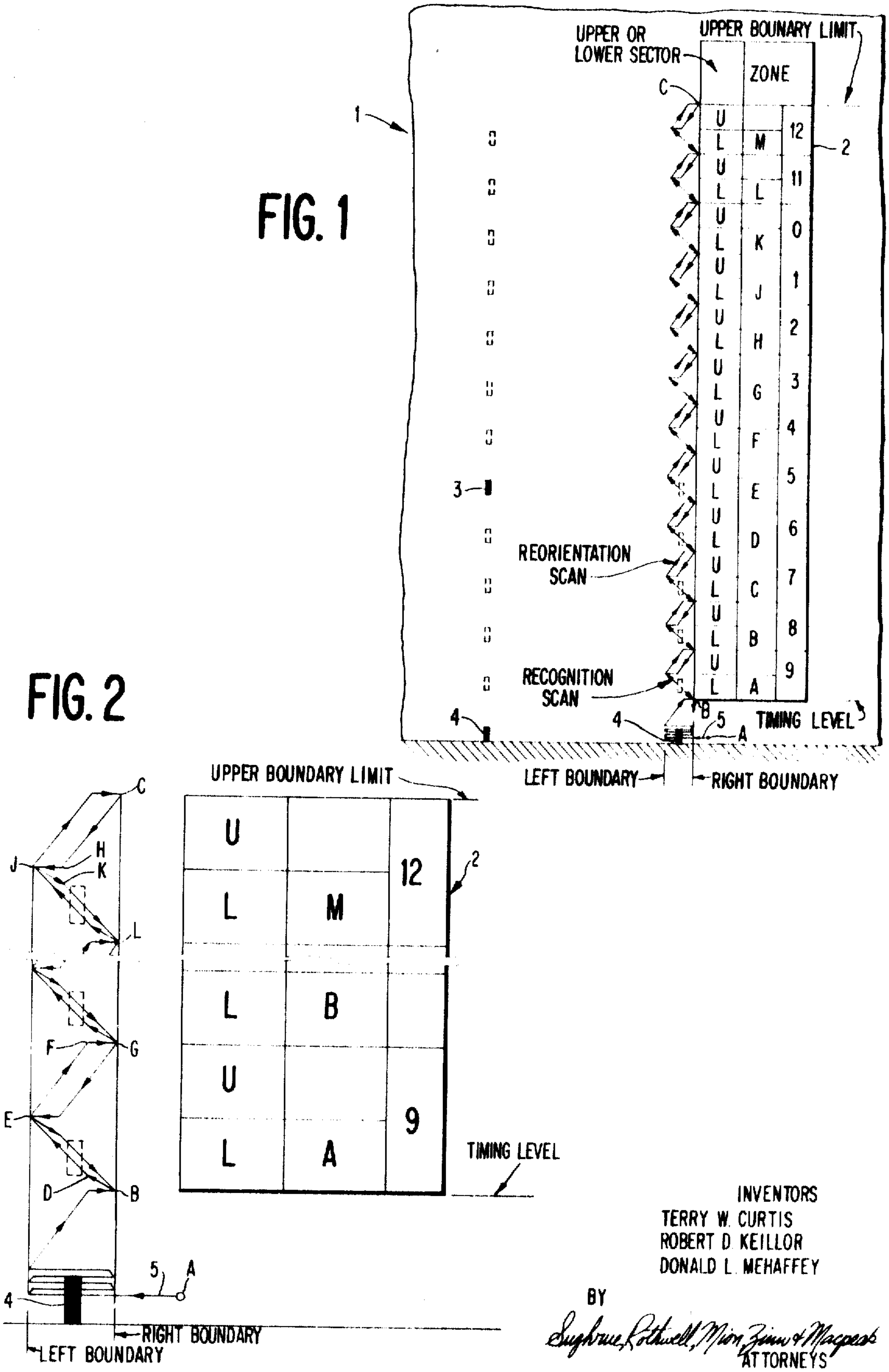
FIG. 1 is an illustration of a document on which there are located marks capable of being read by the present invention.
FIG. 2 is an enlarged illustration of a portion of FIG. 1.

Referring to FIG. 1, there is shown a document 1 which is an example of the kind of document which may be read by the mark reader of the present invention. The document may include a plurality of lines of mark areas with the mark areas being separated in each line on the first coordinate axis and each line of mark areas being displaced along a second coordinate axis. In a specific document shown in FIG. 1, the lines of mark areas extend in a vertical direction and the lines are separated from one another in a horizontal direction. Two lines of marks are illustrated, although it should be apparent to those skilled in the art that multiple lines may be included on the document. Each line of mark areas consists of 12 zones, indicated generally by zones numbered 0 to 12 on chart 2 which is superimposed on document 1 in FIG. 1. Each of the numbered zones consists of an upper and lower sector. The lower sectors indicated generally in chart 2 by lettered zones A through M are the mark areas which are scanned for the presence of a mark. A mark may be placed on a document by darkening an area, such as indicated by the mark 3. Each line of mark areas has a timing mark 4 associated therewith. The timing mark is always present and provides a reference point for the optical beam.

The manner in which the document is scanned will now be explained with reference to the scanning line 5 which represents the beam position as it is scanned across the document. As is well known, in optical reading systems when a beam is turned on and not presently reading a document, the beam is executing a mode of operation referred to as aging. The purpose of aging is merely to move the beam around in no particular manner so that it does not concentrate on a single area spot and thereby burn out the face of the flying spot scanner at that spot.

After the document is placed in the proper position, by means forming no part of the present invention, the beam enters a SEEK mode wherein it is deflected to a first reference point A under command of coordinate input signals which may be externally generated, for example, by a central processing unit. Starting at point A, the beam scans left until it encounters timing mark 4. The system notes the encounter with the timing mark and uses this information to establish right and left boundaries for the scan as indicated in FIG. 1. The beam then scans a small raster across the timing mark between the right and left boundaries until as it is going toward a left boundary it misses the timing mark. The system notes the fact that the timing mark was missed and uses this information to establish a timing level and an upper boundary limit as indicated in FIG. 1. When, after missing the timing mark, the beam reaches the left boundary, it is deflected up to the timing level and over to the right boundary at point B as indicated by the arrows on the scanning line 5. The beam then scans up the numbered zones as indicated by the arrows on scanning line 5, executing a recognition scan in each lower sector and a reorientation scan in each upper sector. The scan up the numbered zones continues until point C at the upper boundary limit is reached. The beam then scans down the numbered zones as indicated by the arrowheads on scanning line 5 until point B is once again reached.

Referring now to FIG. 2 which is an enlarged illustration of a portion of FIG. 1, the manner in which the beam scans the column of mark areas will be described in more detail. When the beam starts from point A it is scanning left at a rate of 4,000 inches per second. Then, as described before, when the beam encounters the timing mark, the left and right boundaries are established. When the beam reaches the left boundary the beam begins scanning right at a rate of 4,000 inches per second. The beam at this time also begins scanning up at a rate of 1,000 inches per second. The beam only scans up for 3.3 microseconds, but continues scanning right until it reaches the right boundary. The beam then begins scanning left at a rate of 4,000 inches per second and it scans up again at a rate of 1,000 inches per second for 3.3 microseconds. The scan beam continues to scan up the timing mark in this manner executing the raster shown in FIG. 2 until on a scan-left the system notes that the timing mark was not encountered. When the beam then arrives at the left boundary, it is directed to scan up at 4,000 inches per second and to the right at 4,000 inches per second. The scan-up at 4,000 inches per second ceases when the timing level is reached, while the scan to the right at 4,000 inches per second continues until the right boundary is reached at point B. The beam is then directed to start scanning up at a rate of 4,000 inches per second and to scan left at a rate of 5,000 inches per second. After 15 microseconds, at which time the beam has arrived at point D, the scan-left rate is decreased to 4,000 inches per second. The scan continues at this rate until point E is reached at the left boundary. After reaching point E, the beam is directed to scan up at 4,000 inches per second and to the right at 4,000 inches per second until the next lower sector is encountered at point F. From point F, the beam scans right at 4,000 inches per second until the right boundary is reached at point G. At point G, the same directions are given the beam as were given at point B. The beam continues to execute a similar scan pattern until point C at the upper boundary limit is reached. Then the beam reverses direction and begins a scan-down. The beam is deflected from point C down at a rate of 4,000 inches per second and to the left at a rate of 4,000 inches per second to point H at which time a lower sector is encountered. The beam continues to scan left at 4,000 inches per second until point J is reached at the left boundary. Then the beam is directed to scan down at a rate of 4,000 inches per second and to the right at a rate of 5,000 inches per second for a period of 15 microseconds, at which time the beam has reached point K. The scan-left rate is then decreased to 4,000 inches per second and the beam continues to scan down and left until the right boundary is reached at point L. The beam continues to scan down the column in this manner until it again reaches point B at the intersection of the timing level and right boundary. From point B the beam is deflected down at 4,000 inches per second for a period of time sufficient to place the beam approximately in the same vertical position as point A at which time downward travel of the beam ceases. The beam then begins scanning left at a rate of 4,000 inches per second to look for the next timing mark. Blanking is applied to the video portion of the system for a period of approximately 30 microseconds which is sufficient to prevent the system from recognizing the timing mark for the column it has just scanned.

It should be noted that due to the changing rates of scan right and left during a recognition scan up or down that a different portion of each mark area is scanned during the scan-down than was scanned on the scan-up. With the beam-scanning rates used in the present invention, a scan separation of approximately 30 mils is achieved. In accordance with the invention, appropriate video signals must be detected for a mark area on both the scan-up and the scan-down before a mark sense output is generated. This prevents noise, such as smudges or ink splatters which may exist in only a portion of a mark area from generating an erroneous mark sense output.

Figure 3:
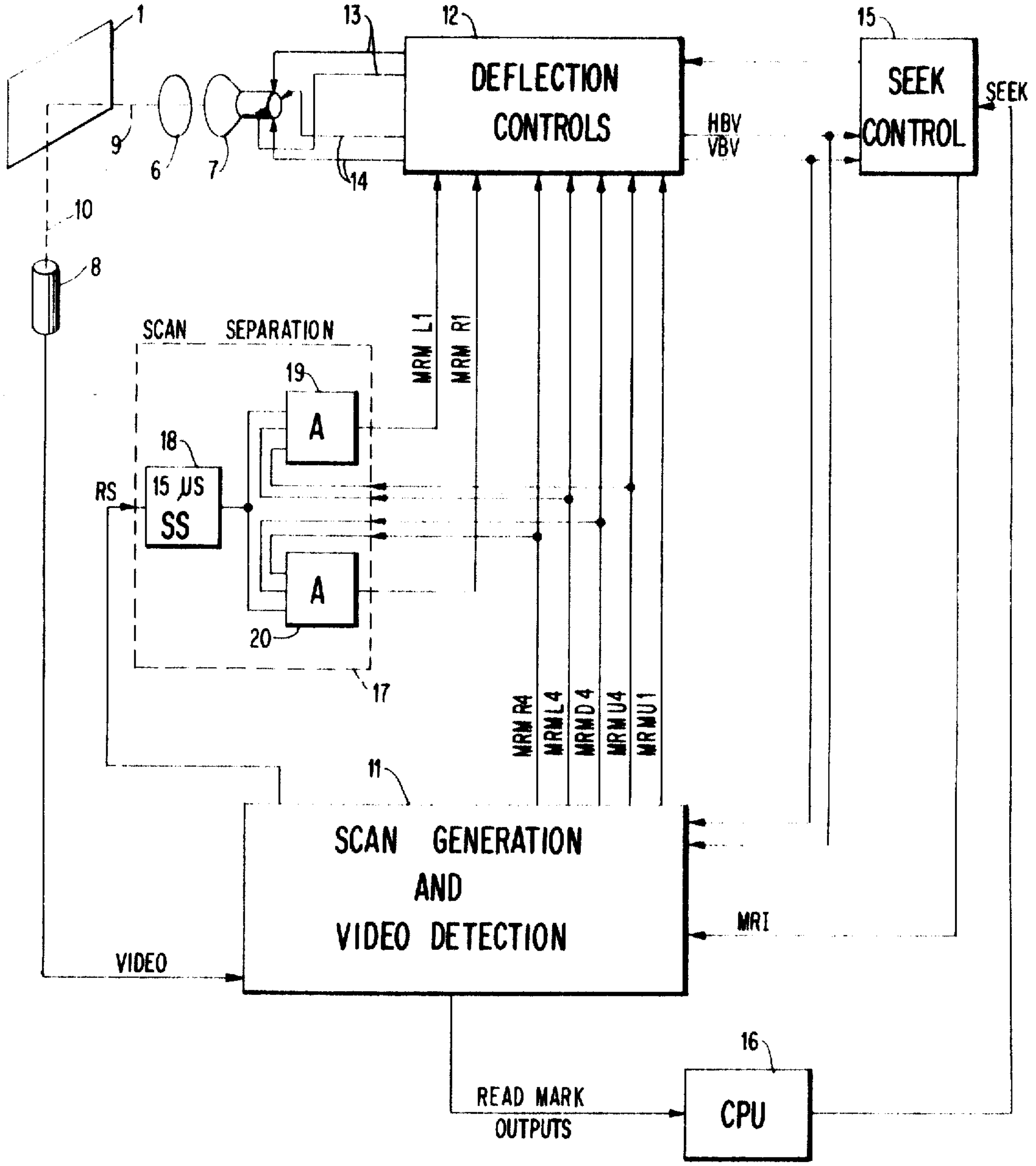
FIG. 3 is a system block diagram of a preferred embodiment of the present invention.

Referring now to FIG. 3, there is shown a system block diagram of a preferred embodiment of the present invention. During the description of FIG. 3 and also of the remaining figures, the following common convention is used for describing signals passing between logic or block units:

Each line connecting the output of one logic element or block to the input of a second logic element or block is labeled by a word or symbol. In the description the word or symbol is used to indicate the signal voltage or current on that line. When the signal is said to be "up" or "present," it means that the signal on the line is of the proper state to energize the logic element or elements to which it is connected.

The apparatus of FIG. 3 includes a flying spot scanner comprising optical system 6, a cathode-ray tube 7, and a photomultiplier tube 8. The cathode-ray tube 7 in combination with optical system 6 directs a beam 9 toward the document 1 resulting in a reflected beam 10 which is detected by the photomultiplier tube 8. The output VIDEO of photomultiplier tube 8 is connected to the scan generation and video detection circuitry 11.

The movement of beam 9 is controlled by the deflection controls 12 whose outputs are connected via leads 13 to the horizontal deflection coils in cathode-ray tube 7 and via leads 14 to the vertical deflection coils of the cathode-ray tube 7. The deflection controls 12 form no part of the present invention and are not described in detail herein. Suitable controls are described in commonly assigned U.S. Pat. application Ser. No. 743,128, filed July 8, 1968, for "Mark Read Using Small Raster," by Paul E. Nelson. There are two output signals from the deflection controls 12 in addition to the outputs which control horizontal and vertical deflection. They are the horizontal beam voltage HBV and the vertical beam voltage VBV, representing, by analog voltages or currents, the horizontal and vertical positions of the beam 9.

The SEEK mode of operation is controlled by a SEEK control 15 which, in turn, is under control of an external system such as, for example, central processing unit 16. The SEEK control 15 may be any unit, of a type well known in the art, which receives coordinate input signals SEEK and commands the deflection controls 12 to move the beam up, down, left or right to properly position the beam at the point defined by the SEEK coordinate inputs. The SEEK control unit 15 monitors the exact beam position via the horizontal beam voltage HBV and the vertical beam voltage VBV input signals. When the beam is positioned at the proper SEEK point, SEEK control 15 provides a mark read initiate MRI output which may, for example, be a 6-microsecond pulse, to inform scan generation and video detection circuitry 11 to begin operation.

In addition to the mark read initiate MRI and video inputs, the scan generation and video detection circuitry 11 has as inputs the horizontal beam voltage HBV and the vertical beam voltage VBV which indicate where the beam is located at any particular time. From these inputs, scan generation and video detection circuitry 11 generates five outputs which are applied to deflection controls 12. The output mark read move up one, MRMU1, commands the deflection controls to move the beam up at 1,000 inches per second. The outputs mark read move up four, MRMU4; mark read move down four, MRMD4; mark read move left four, MRML4; and mark read move right four, MRMR4, command the deflection controls to respectively move the beam up, down, left, or right at 4,000 inches per second.

The scan generation and video detection circuitry 11 has one other output. This is recognition sweep RS which is present when a recognition scan rather than a reorientation scan is being executed. There are four other inputs to scan separation circuitry 17. These consist of the outputs of scan generation and video detection circuitry 11, MRMR4 MRML4, MRMD4, and MRMU4, which are up, respectively, whenever the beam is moving right, left, down or up at a rate of 4,000 inches per second.

Scan separation circuitry 17 comprises a 15-microsecond single-shot multivibrator 18 and AND gates 19 and 20. The inputs to AND gate 19 are MRML4, MRMU4, and, for 15 microseconds recognition sweep RS. The output of gate 19 is MRML1 which commands deflection controls 12 to move the beam left at 1,000 inches per second. The output MRML1 of gate 19 will be present for the first 15 microseconds of a recognition scan in which the beam is moving up at 4,000 inches per second and to the left at 4,000 inches per second. Thus, during the first 15 microseconds of a recognition scan-up, deflection controls 12 are commanded to move the beam up at 4,000 inches per second and to the left at 5,000 inches per second. Similarly, the output MRMR1 of gate 20 is up during the first 15 microseconds of a recognition sweep-down. Thus, during the first 15 microseconds of a recognition sweep-down, the beam will be moving down at a rate of 4,000 inches per second and to the right at a rate of 5,000 inches per second. The effect therefore of scan separation circuitry 17 is to cause the beam to scan a different portion of each mark area on the scan-down than was scanned on the scan-up, as was shown and discussed with respect to FIG. 2.

Figure 4:
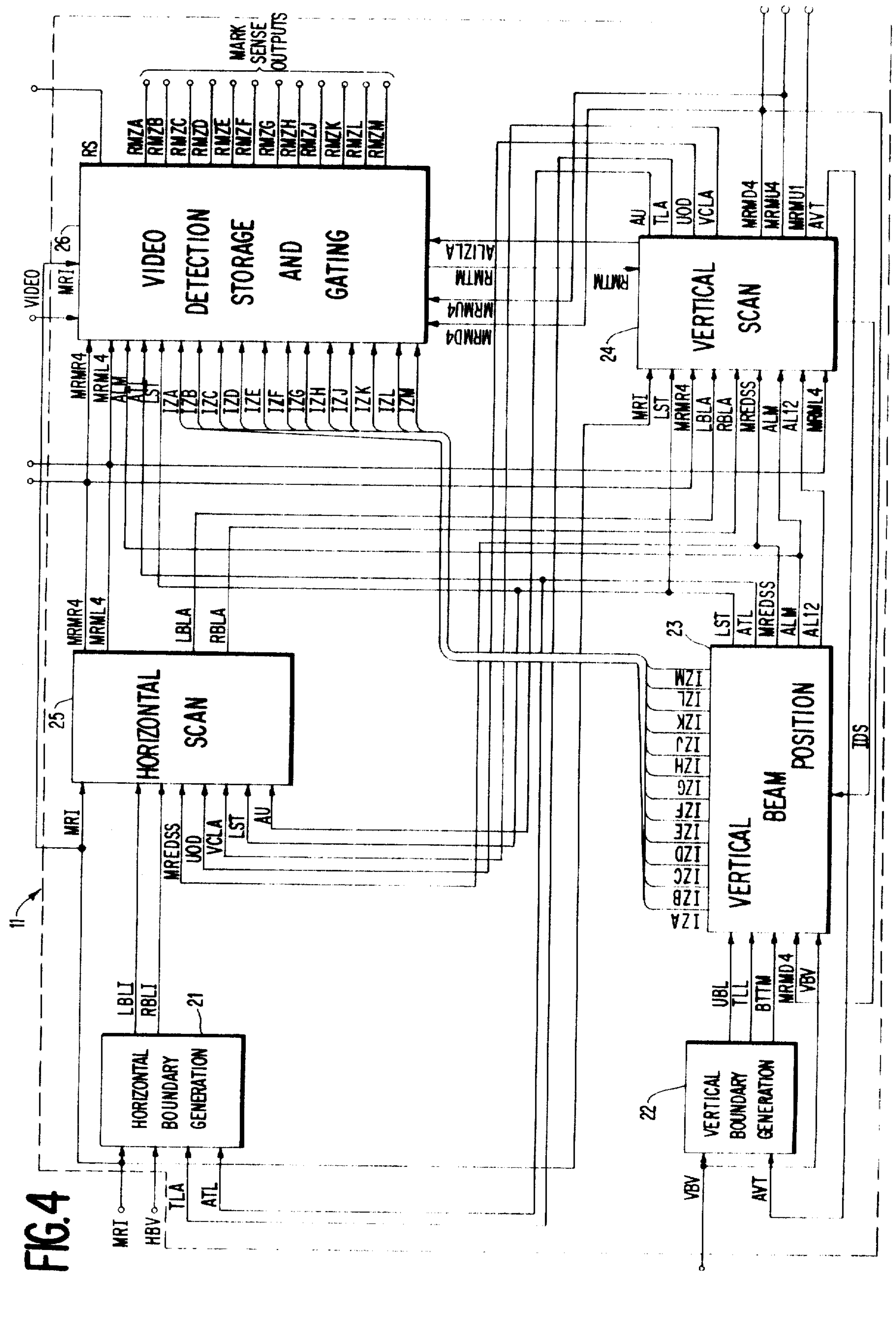
FIG. 4 is a system block diagram of the scan generation and video detection circuitry of FIG. 3.

In FIG. 4 there is shown a system block diagram of the scan generation and video detection circuitry 11 of FIG. 3. Scan generation and video detection circuitry 11 generally comprises horizontal boundary generation circuitry 21, vertical boundary generation circuitry 22, vertical beam position circuitry 23, vertical scan circuitry 24, horizontal scan circuitry 25, and video detection, storage and gating circuitry 26. In response to the mark read initiate MRI input going up, the MRML4 output of horizontal scan circuitry 25 goes up and the beam begins scanning left at 4,000 inches per second. When the beam crosses a timing mark, output read mark timing mark RMTM of video detection, storage and gating circuitry 26 goes up which causes the signals timing latch TLA, vertical control latch VCLA, and allow vertical tracking AVT to go up. When the TLA input of horizontal boundary generation circuitry 21 goes up, this circuitry senses and stores the horizontal beam voltage at that instant on its input HBV. By adding and subtracting voltage increments to this stored voltage, the right and left boundaries for the scan are established. Thus, whenever the beam is at the left boundary, as sensed by horizontal boundary generation circuitry 21 through its input HBV, output left boundary limit LBLI is up. Similarly, when the beam is at the right boundary, output right boundary limit RBLI is up.

The beam continues to move left at 4,000 inches per second until the left boundary is reached and LBLI goes up. At that time, inputs LBLI and VCLA of horizontal scan circuitry 25 are up which causes output MRML4 to go down and MRMR4 and left boundary latch LBLA outputs to go up. Output MRMR4 being up causes the beam to begin scanning right at 4,000 inches per second. As long as the signal allow up AU of vertical scan circuitry 24 is down, which it is at this time, input LBLA being up causes output MRMU1 to be up. Output MRMU1 being up causes the beam to start scanning up at 1,000 inches per second. Thus, the beam begins scanning up at 1,000 inches per second and to the right at 4,000 inches per second. While the beam is scanning up, output up or down UOD of vertical scan circuitry 24 is up which causes LBLA to go down again after signal MRMR4 goes up and the beam begins moving right.

Signal MRMU1 goes down again at the end of 3.3 microseconds and the beams cease to move up. The beam continues, however, to scan to the right at 4,000 inches per second until it reaches the right boundary, causing RBLI to go up, which, in turn, causes RBLA to go up. When RBLA goes up, AVT goes down, MRMR4 goes down, MRML4 goes up again, and MRMU1 goes up again for 3.3 microseconds. The beam then scans left at 4,000 inches per second and up at 1,000 inches per second for 3.3 microseconds, at which time MRMU1 goes down and the beam ceases to scan up. However, MRML4 is still up and the beam continues to scan left until the left boundary is again reached. Signal UOD has meanwhile caused RBLA to go down again as soon as the beam left the right boundary.

If the timing mark is again detected on the sweep to the left, AVT goes up and the sequence of operations is as before, i.e., after reaching the left boundary the beam scans to the right at 4,000 inches per second and up at 1,000 inches per second for 3.3 microseconds, but continues scanning right until the right boundary is reached. However, on the first sweep left in which the timing mark is not detected, AVT stays down. If the beam reaches the left boundary so that LBLA is up but AVT is down, the allow up AU signal goes up. When AU goes up, MRMU1 goes down and MRMU4 goes up. Also, since the beam is at the left boundary LBLA goes up which causes MRML4 to go down and MRMR4 to go up. The beam then begins scanning up at 4,000 inches per second and to the right at 4,000 inches per second.

The beam reaching the left boundary without detecting the time mark so that AVT is down, also serves to establish a timing level limit TLL and an upper boundary limit UBL which are vertical reference points for the scan. Vertical boundary generation circuitry 22 has as inputs the vertical beam voltage VBV and AVT. When AVT goes down, signalling that the timing mark for the first time has not been detected on the scan left, the vertical boundary generation circuitry 22 stores the vertical voltage on VBV at that time. Voltage increments are added to the stored voltage to establish a voltage representing the vertical position of the timing level, TLL, and the vertical position of the upper boundary limit UBL.

Meanwhile, a scan up at 4,000 inches per second and to the right at 4,000 inches per second continues until the beam arrives at the timing level. When the beam arrives at the timing level, input lower sector trigger LST to vertical scan circuitry 24 goes up. Signal MRMR4 is still up at this time. When MRMR4 is up and LST goes up, MRMU4 goes down so that the beam ceases to move up but continues to move right at 4,000 inches per second. When the beam reaches the right boundary, RBLA goes up which causes MRMR4 to go down, MRML4 to go up, and MRMU4 to go up. The beam then starts scanning up and to the left. As discussed before, the scan separation circuitry 17 of FIG. 3 causes the scan left and right rates to change during a recognition scan. This scan is a recognition scan and it continues until the beam reaches the left boundary. While the beam is making this recognition scan signal IZA of vertical beam position circuitry 23 is up so that video detection storage and gating circuitry 26 knows that the beam is scanning in zone A. Any video inputs above a predetermined minimum to video detection, storage and gating circuitry 26 while IZA and MRMU4 are up is stored as an indication that a valid mark was read in zone A on the upscan.

After the recognition scan through zone A is concluded, the beam reaches the left boundary. Reaching the left boundary causes LBLA to go up which causes MRML4 to go down and MRMR4 to go up. Thus, the beam begins a reorientation scan up at 4,000 inches per second and to the right at 4,000 inches per second. When the beam reaches the bottom of the next lower sector LST goes up again. LST going up causes MRMU4 to go down. Thus, when the beam reaches the lower sector it ceases to move up but continues to move right at 4,000 inches per second until the right boundary is reached. When the beam reaches the right boundary, the reorientation scan is concluded and the beam begins another recognition scan, with generally the same inputs and outputs to the various circuitry going up and down as before. However, input IZB to video detection, storage and gating circuitry 26 is up during this second recognition scan and signal IZA is down. Therefore, if video above a predetermined minimum level is sensed for the next recognition scan, video detection, storage and gating circuitry 26 will store an indication that a mark was sensed in zone B. The beam continues to execute alternate recognition and reorientation scans with video detection, storage and gating circuitry 26 storing an indication of those mark areas in which marks were sensed until the beam reaches the upper boundary limit. When the beam reaches the upper boundary limit signal AL12 from vertical beam position circuitry 23 goes up. When AL12 goes up output VCLA of vertical scan circuitry 24 goes down as does MRMU4. Further, VCLA going down and RBLA being up (at right boundary) causes MRMD4 to go up. RBLA going up has also caused MRML4 to go up, so that the beam begins to scan down at 4,000 inches per second and to the left at 4,000 inches per second. When the beam encounters the first lower sector on the way down (zone M) LST goes up which turns off MRMD4. MRML4 continues to be up, however, so that the beam moves left at 4,000 inches per second until it reaches the left boundary. At this point, LBLA goes up which causes MRML4 to go down and MRMR4 to go up. MRMD4 is also caused to go up at this time and the beam begins to scan down and to the right, executing a recognition scan-down. As discussed before, scan separation circuitry 17 of FIG. 3 operates to vary the scan rate to the right during a recognition scan-down. Input IZM to video detection, storage and gating circuitry 26 is up during this recognition scan. If video above a predetermined minimum is detected during this recognition scan-down, and a mark was sensed in zone M during the scan up, a read mark zone M, RMZM, mark sense output is provided.

The beam then continues to execute alternate recognition and reorientation scans down, with the same inputs and outputs to the various circuitry going up and down as described above. However, the inputs IZL, IZK, etc. to video detection storage and gating circuitry 26 are up only during a recognition scan in the indicated zone. If, during a recognition scan in any of these zones, video above a predetermined minimum is detected and a mark was sensed for the same zone on the scan up, an appropriate mark sense output is provided for that zone.

When the beam is scanning down and reaches the timing level and is at the right boundary, RBLA is up which causes MRMR4 to go down. MRML4 does not go up because LST and VCLA are both down. MRMD4 is still up so that the beam continues to move down at 4,000 inches per second. When, however, the beam reaches a prescribed distance below the timing mark signal BTTM of vertical boundary generation circuitry 22 goes, indicating that the beam is a prescribed distance below the top of the timing mark. When BTTM goes up, a signal MREDSS goes up. MREDSS is up for 5.6 microseconds and functions to turn off MRMD4 and turn on MRML4. Thus the beam travels along the right boundary down below the timing mark and then begins scanning left for the next timing mark. Vertical scan circuitry 24 provides 30 microseconds of blanking to prevent recognition of the timing mark for the column of mark areas which was just scanned. Therefore, TLA is held down for 30 microseconds rather than going up when the signal RMTM corresponding to the timing mark for the column just scanned is present.

Referring now to FIG. 5, there is shown a logic block diagram of the horizontal boundary generation circuitry 21 of FIG. 4. A horizontal storage track hold 27 has input terminals A and B and an output terminal C. When there is an input at terminal A, the voltage output on terminal C follows the voltage at terminal B. When, however, the input is removed from terminal A, the horizontal storage track hold 27 holds at terminal C whatever voltage is on terminal B when the input is removed. Track hold circuits which operate in this manner are known, and are described in commonly assigned U.S. Pat. application Ser. No. 619,226, filed Feb. 28, 1967, for "High Speed Registration Techniques for Position Code Scanning," by William Hardin et al.

The input to terminal B of horizontal storage track hold 27 is the horizontal beam voltage HBV. The input to terminal A of horizontal storage track hold 27 is the output of an OR gate 28. The inputs to the OR gate are mark read initiate MRI and the output of an AND gate 29. The output of the AND gate 29 is up when timing latch TLA and above timing level ATL are both not up. When both TLA and ATL are not up the inputs to AND gate 29 are up by reason of NOT gates 30 and 31. When the beam is scanning left from a SEEK point and encounters a timing mark, TLA goes up as will be described later in connection with the vertical scan circuitry. When TLA goes up the output of AND gate 29 goes down. Inasmuch as MRI is only up for approximately 5.6 microseconds, during which time the beam will not encounter a timing mark, input terminal A of horizontal storage track hold 27 goes down when the timing mark is encountered. The horizontal storage track hold 27 stores at terminal C the voltage existing at terminal B at that time. Offset voltages generated by offset voltage generator 34 are summed in voltage summers 32 and 33 with the voltage on terminal C of horizontal storage track hold 27. The outputs of voltage summers 32 and 33 are analog voltages representing the right and left boundaries, and form inputs to voltage discriminators 35 and 36. The voltage discriminators 35 and 36 also receive as inputs the horizontal beam voltage HBV. The voltage discriminators 35 and 36 are of a type well known in the art and operate to provide a digital output whenever a selected one of the analog input voltages exceeds the other analog input voltage. Thus, when the beam is at the left boundary output LBLI of voltage discriminator 35 will be up, and when the beam is at the right boundary, output RBLI of voltage discriminator 36 will be up.

FIG. 6 is a logic block diagram of the vertical boundary generation circuitry 22 of FIG. 4. In FIG. 6 a vertical storage track hold 37 has terminals A, B and C. The voltage at terminal C follows that at point B as long as terminal A is up. When, however, terminal A goes down, the voltage existing at terminal B at that moment is stored at terminal C. Thus, the vertical beam voltage VBV at terminal B is present at terminal C while allow vertical tracking AVT input to terminal A is up. However, as will be discussed hereinafter in connection with the vertical scan circuitry, when the beam is scanning left and reaches the left boundary without having encountered the timing mark, AVT goes down. Consequently, the voltage stored at point C represents the vertical beam voltage at the top of the timing mark. This voltage stored at terminal C is summed by voltage summers 38 and 39 with offset voltages generated by offset voltage generators 40 and 41, respectively. The output of voltage summer 38 is an analog voltage VBL equivalent to the vertical beam voltage at the upper boundary limit, and the output of voltage summer 39 is an analog voltage TLL equivalent to the vertical beam voltage at the timing level limit. The stored voltage on terminal C of vertical storage track hold 37 is also summed in a voltage summer 42 with an offset voltage generated by offset voltage generator 43. The output of voltage summer 42 is an analog voltage equivalent to a vertical beam voltage for a beam position approximately 25 mils below the top of the timing mark. This output voltage of voltage summer 42 is compared in voltage discriminator 44 with the vertical beam voltage VBV. When the two compared voltages are equal, the output BTTM is up, indicating that the beam is approximately 25 mils below the top of the timing mark.

Referring now to FIG. 7, there is shown a logic block diagram of the horizontal scan circuitry 25 of FIG. 4. The characteristics of the inputs to horizontal scan circuitry 25 are as follows: mark read initiate, MRI, is only present for 5.6 microseconds after a scan left begins from a SEEK point. Left boundary limit LBLI is present or up whenever the beam is at the left boundary. Similarly, the right boundary limit RBLI is up or present when the beam is at the right boundary limit. The mark read end down single shot, MREDSS, is a signal generated by the vertical scan circuitry and is up for 5.6 microseconds after the beam has passed a specified distance below the top of a timing mark on a scan down. The up or down input UOD is present whenever the beam is scanning up or down at any rate. Input vertical control latch VCLA is present during a scan-up after a timing mark has been detected on a scan left. Input lower sector trigger LST is up for approximately 10 microseconds after the beam moves into a lower sector. The allow up input AU goes up when the beam reaches the left boundary without encountering the timing mark and AU then remains up throughout an entire scan up and down.

Now referring to the logic sown in FIG. 7, a left boundary latch 45 is set when the output of an AND gate 46 is up. The output of AND gate 46 is up when MRI is not up because of NOT gate 47, when MREDSS is not present due to NOT gate 48, when MRML4 is up (beam is moving left at 4,000 inches per second), and the left boundary limit LBLI is up (beam is at left boundary). A right boundary latch 49 is set whenever the output of AND gate 50 is up. The output of AND gate 50 is up when MRMR4 is up (beam is moving right at 4,000 inches per second, and RBLI is up (beam is at right boundary).

The left boundary latch 45 is reset when the output of AND gate 51 is up. The output of AND gate 51 is up when the beam is moving up or down and is moving right. The right boundary latch 49 is reset when the output of AND gate 52 is up, which occurs when the beam is moving up or down and is moving left. A move left latch 53 is set by OR gate 54 when any of the outputs of AND gate 55, 56 or 57 are up. The output from AND gate 55 is up when RBLA is up (right boundary latch set), VCLA is up (have crossed timing mark and is moving up), and LST is up (have entered a lower sector within the preceding 10 microseconds). The output of AND gate 56 is up when LST is not up due to NOT gate 58, VCLA is not up due to NOT gate 60, and neither RBLA is up or MRI is up due to OR gate 59. The output of AND gate 57 is up when RBLA is up (right boundary latch set), and AU is not up due to NOT gate 61 (have not yet reached top of timing mark). When move left latch 53 is set, output MRML4 is up, causing the beam to move left at 4,000 inches per second.

A move right latch 62 is set through OR gate 63 whenever the output of either AND gate 64 or AND gate 65 is up. The output of AND gate 64 is up when VCLA is up, LST is not up due to NOT gate 66, and LBLA is up. The output of AND gate 65 is up if LBLA is up, LST is up, and VCLA is not up due to NOT gate 67.

In operation, in response to an MRI input, the output of AND gate 56 goes up and sets, through OR gate 54, the move left latch 53. Output MRML4 of move left latch 53 goes up and the beam begins scanning left at 4,000 inches per second. When the beam reaches the left boundary, the output of AND gate 46 goes up, setting left boundary latch 45. The output LBLA of left boundary latch 45 goes up, sets the move right latch 62 and resets the move left latch 53. When output MRMR4 of move right latch 62 goes up, the beam begins scanning right at 4,000 inches per second. When the beam reaches the right boundary, the right boundary latch 49 is set. This sets the move left latch 53 and resets move right latch 62. Output MRML4 of move left latch 53 going up causes the beam to begin moving left at a rate of 4,000 inches per second. This sequence of setting and resetting latches continues through the scan-up and scan-down until the beam reaches the timing level at the right boundary on a scan-down. Input LST does not go up so that move left latch 53 is not set. The horizontal scan circuitry does not influence the beam travel again until MREDSS goes up for 5.6 microseconds which, through AND gate 46, sets left boundary latch 45 and the alternating left and right horizontal scanning begins again.

Figure 8:
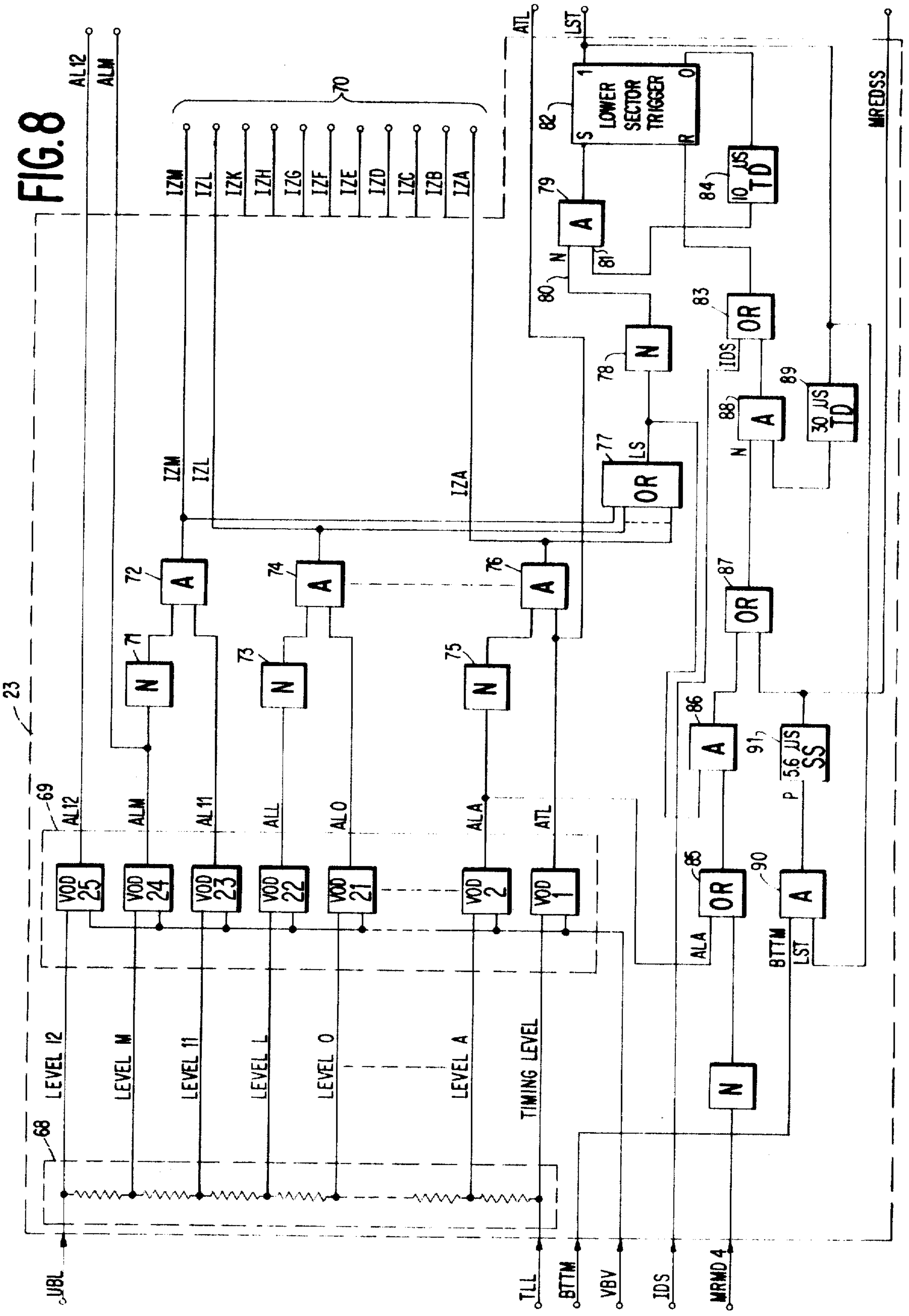
FIG. 8 is a logic block diagram of the vertical beam position circuitry of FIG. 4.

FIG. 8 shows a logic block diagram of the vertical beam position circuitry of FIG. 4. The two inputs UBL and TLL are analog voltages representing the upper boundary limit and the timing level limit, respectively, of the beam travel during a scan. These two inputs are connected to opposite ends of a resistive voltage divider 68. The outputs of voltage divider 68 are 25 analog voltages equal to what the vertical beam voltage will be when the beam is at the bottom or top of any of the lettered or numbered zones of FIG. 1. For example, the output level 12 refers to the vertical beam voltage that would exist if the beam were at the upper boundary limit, which is the top of zone 12. Similarly the output level M is equal to the vertical beam voltage that would exist if the beam were at the top of zone M. Only seven of these analog voltage outputs of resistive voltage divider 68 as shown in FIG. 8, but it should be understood that there are 25 outputs, one corresponding to the vertical beam voltage that would exist if the beam were at the timing level, and one corresponding to the vertical beam voltage that would exist if the beam were at the top of each of the 12 numbered and 12 lettered zones shown in FIG. 1.

The outputs of resistive voltage divider 68 form the inputs to a group 69 of voltage discriminators. There are 25 individual voltage discriminators within group 69. These individual voltage discriminators are labeled VOD 1 to VOD 25. The voltage discriminators are of a type well known in the art and function to compare two analog input voltages and generate a digital output whenever a selected one of the analog input voltages exceeds the other analog input voltage. Each of the voltage discriminators is associated with and receives as an input one of the outputs of resistive voltage divider 68. Thus, only seven voltage discriminators are shown in FIG. 8 but it should be understood that there are 25 voltage discriminators. All of the voltage discriminators VOD 1 to VOD 25 also receive the vertical beam voltage VBV as an input. Each of the voltage discriminators will provide a digital 1 output when the voltage input to the voltage discriminator from resistive voltage divider 68 is greater than the vertical beam voltage VBV input to the voltage discriminator. There are 25 outputs from group 69 of voltage discriminators VOD 1 to VOD 25, although only seven of these outputs are shown in FIG. 8. Whenever, for example, the beam is above level 12, the output AL 12 of voltage discriminator 25 will be up. Similarly, when the beam is above level M the output of voltage discriminator 24 ALM will be up. The outputs of the group 69 of voltage discriminators are used to generate a group of outputs 70 which indicate whether the beam is in a particular lettered sector. For example, when the beam is in zone M, output IZM is up. When the beam is in zone L, output IZL is up. Similarly, when the beam is in a particular lettered zone, the corresponding output of the outputs 70 will be up.

The manner in which the outputs 70 are generated will now be discussed. When the beam is in zone M, output AL 11 of voltage discriminator VOD 23 will be up since the beam is above the top of zone 11. At the same time, output ALM of voltage discriminator VOD 24 will be down since the beam is below the top of zone M. Output ALM taken through NOT gate 71 forms an input to AND gate 72. Output AL 11 forms a second input to AND gate 72. Thus, when AL 11 is up and ALM is down, the output IZM of AND gate 72 is up, indicating that the beam is presently located in zone M. In a like manner, output ALL taken through NOT gate 73 forms an input to AND gate 74. Output AL 0 forms a second input to AND gate 74. Thus, when the beam is located in zone L the output IZL of AND gate 74 is up. Similarly, output ALA is taken through a NOT gate 75 to form one input to AND gate 76. Output ATL is the other input to AND gate 76. When ATL is up and ALA is down, the output IZA of AND gate 76 will be up, indicating that the beam is located in zone A. Circuitry (not shown) similar to NOT gates 71, 73 and 75 and AND gates 72, 74, and 76 is provided for combining the outputs of voltage discriminators VOD 3 through VOD 20 to provide outputs IZB through IZK of outputs 70.

Each of the outputs IZA through IZM are combined in an OR gate 77 to provide an output LS which is up whenever the beam is in one of the lettered, lower sector zones. Output LS forms the input to a NOT gate 78. The output of NOT gate 78 forms an input 80 to AND gate 79. The AND gate 79 has AC set and reset inputs and is a device of a type well known in the art. Briefly, in order for the output of AND gate 79 to be up, input 81 must be up and input 80 must be going through a negative transition, i.e. 1 to 0. This is indicated by the letter N at input 80. The output of AND gate 79 forms the set input to a lower sector trigger 82. Prior to the beam reaching any of the lower sectors, lower sector trigger 82 will have been reset by the 5.6-microsecond signal MRI coupled through OR gate 83 to the reset input of lower sector trigger 82. When lower sector trigger 82 is set, its "1" output is up and its "0" output is down. When it is reset, its "1" output is down and its "0" output is up. The "0" output of lower sector trigger 82 is coupled through a 10-microsecond time delay 84 to input 81 to AND gate 79. Therefore, when the output LS of OR gate 77 first goes up, i.e. the beam enters zone A, the lower sector trigger 82 will have been reset for at least 10 microseconds due to MRI having gone up. Thus, when LS goes up the output of AND gate 79 goes up and lower sector trigger 82 is set when the beam enters zone A, causing its output LST to go up. As soon as the beam leaves zone A, input ALA to OR gate 85 from voltage discriminator VOD 2 goes up. The output of OR gate 85 is one input to an AND gate 86. AND gate 86 also receives an input from NOT gate 78. Therefore, when the beam leaves zone A, output LS of OR gate 77 will be down, input ALA to OR gate 85 will be up, causing the output of AND gate 86 to be up. The output of AND gate 86 is connected to an input of OR gate 87. The output of OR gate 87 is connected to a negative transition AND gate 88. The "1" output of lower sector trigger 82 is also connected to negative transition AND gate 88 through a 30-microsecond time delay 89. Thus, the output of AND gate 88 goes up when the lower sector trigger has been set for at least 30 microseconds and when the output of OR gate 87 goes down, or through a negative transition. The output of OR gate 87 goes down when LS goes down, indicating that the beam has left a lower sector.

The output 88 of negative transition AND gate 88 is connected through OR gate 83 to the reset input of lower sector trigger 82. Thus, when the beam leaves zone A the lower sector trigger 82 will be reset. Lower sector trigger 82 will be set again when the next lower sector is encountered, which will be more than 10 microseconds after the lower sector trigger 82 was reset. Lower sector trigger 82 will then be reset each time the beam leaves a lower zone. When the beam arrives at the upper boundary limit and starts to scan-down, input initiate down sweep IDS to OR gate 83 goes up to ensure that lower sector 82 is reset. The lower sector trigger 82 is then set on a scan-down each time the beam enters a lower sector, i.e. one of the lettered zones. The lower sector trigger 82 is then reset as described before when the beam leaves a lower sector on a scan-down until the beam encounters zone A on a scan-down.

When the beam encounters zone A on a scan-down, the lower sector trigger 82 is set as described before. However, when the beam leaves zone A on a scan-down the lower sector trigger 82 is not reset as before. This is due to the fact that the output of OR gate 85 does not go up when the beam leaves zone A on a scan-down because the beam is moving down and is not above level A. Lower sector trigger 82 remains set on a scan-down after leaving zone A until input BTTM to AND gate 90 goes up. BTTM goes up when the beam is scanning down and arrives a specified distance below the top of the timing mark. When BTTM goes up, input LST TO to AND gate 90 is also up so that the output of AND gate 90 goes up. The output of AND gate 90 is connected to a single-shot multivibrator 91. Single-shot multivibrator 91 operates to provide a 5.6-microsecond output when its input executes a positive, i.e. O to 1, transition. This is indicated by the letter P on the input to single-shot multivibrator 91. The output MREDSS of single-shot multivibrator 91 is connected through OR gate 87 to an input of negative transition and gate 88. Since the MREDSS output of single-shot multivibrator 91 is up for only 5.6 microseconds, at the end of the 5.6 microseconds it goes down, causing the output of AND gate 88 to go up and reset lower sector trigger 82 through OR gate 83.

Thus, the vertical beam position circuitry 23 shown in FIG. 8 operates to provide a number of outputs. Outputs 70 provides an indication of which of the lettered zones the beam is in. Output LST of lower sector trigger 82 is up whenever the beam is in a lower sector. Outputs AL 12 and ALM indicate whether the beam is above level 12 or above level M, respectively. Output MREDSS provide an indication that the beam has reached a specified distance below the top of the timing mark on a scan-down.

Figure 9:
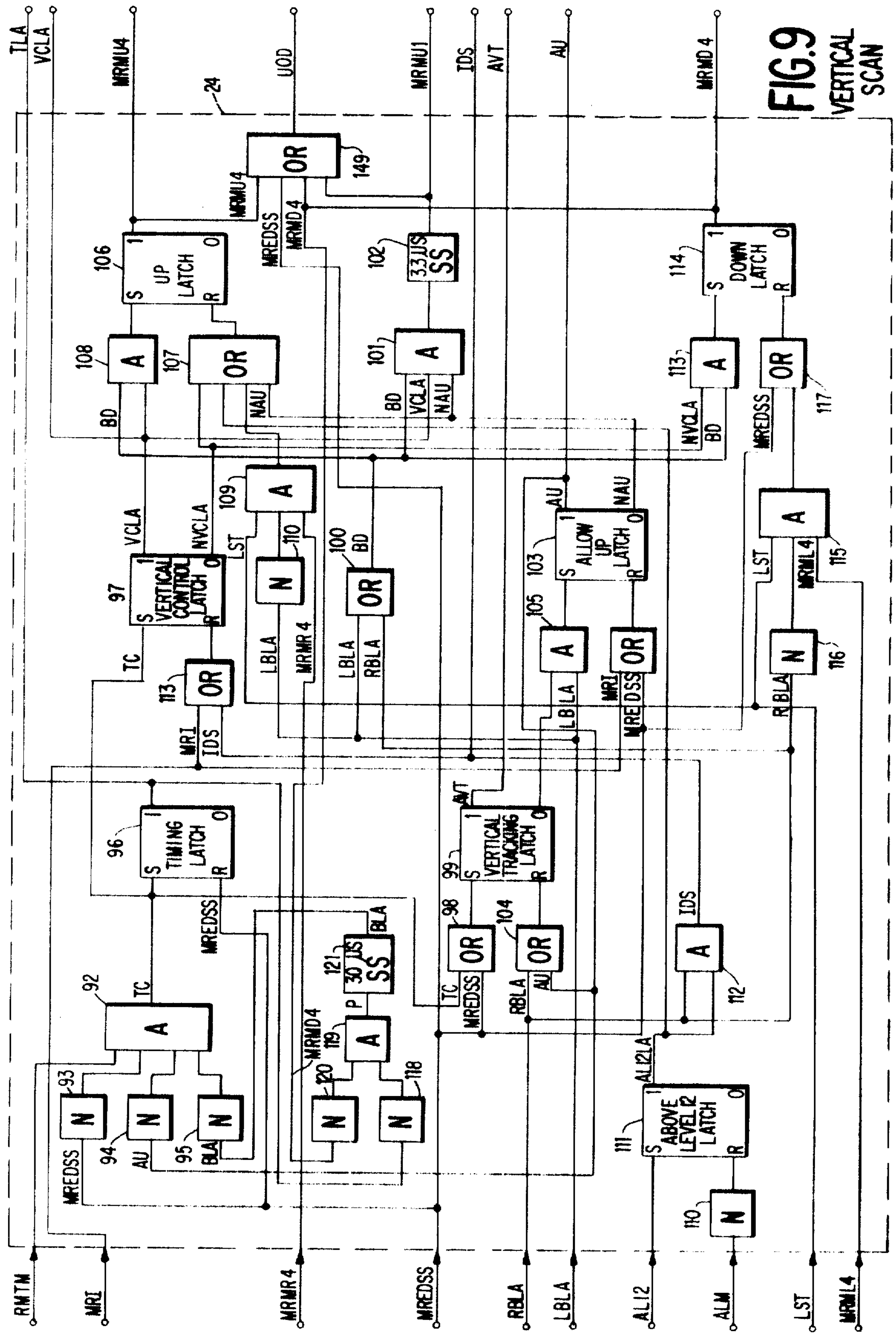
FIG. 9 is a logic block diagram of the vertical scan circuitry of FIG. 4.

FIG. 9 is a logic block diagram of the vertical scan circuitry 24 of FIG. 4. The vertical scan circuitry 24 operates to provide vertical controls and commands for moving the beam up or down. As discussed before, at the beginning of a scan operation, the beam begins moving left from a SEEK point until a timing mark is encountered. When a timing mark is encountered input RMTM to AND gate 92 goes up. At this time, inputs MREDSS, AU and BLA to NOT gates 93, 94 and 95 are not up so that the output timing crossover signal TC of AND gate 92 goes up. The output TC of AND gate 92 is connected to the set input of a timing latch 96. When the output TC of AND gate 92 goes up timing latch 96 is set and output TLA of timing latch 96 goes up. Output TC and AND gate 92 is also connected to the set input of a vertical control latch 97 and serves to set vertical control latch 97 when the timing mark is encountered, causing output VCLA of vertical control latch 97 to go up. Output TC of AND gate 92 is also connected through OR gate 98 to the set input of vertical tracking latch 99 and functions to set vertical tracking latch 99 when the timing mark is encountered. It should be remembered that the beam is scanning left at this time and has just encountered the timing mark. Nothing further happens in the vertical scan circuitry 23 until the beam reaches the left boundary, causing input LBLA to go up. When LBLA goes up, the output BD of OR gate 100 goes up. Therefore, inputs BD, VCLA and NAU to AND gate 101 are all up so that the output of AND gate 101 is up. The output of AND gate 101 is connected to a 3.3-microsecond single-shot multivibrator 102. When the beam reaches the left boundary and the allow up latch 103 is not set, single-shot multivibrator 102 provides an output MRMU1 for 3.3 microseconds which commands the beam to move up for 3.3 microseconds.

Nothing further happens in the vertical scan circuitry until the beam reaches the right boundary, at which time input RBLA goes up. When input RBLA goes up, the vertical tracking latch 99 is reset through OR gate 104. At the same time output BD of OR gate 100 goes up causing the output of AND gate 101 to go up and single-shot multivibrator 102 to provide a 3.3-microsecond output MRMU1, which commands the beam to move up at a rate of 1,000 inches per second for a period of 3.3 microseconds. If the timing mark is encountered on the next scan-left, output TC of AND gate 92 goes up again, setting vertical tracking latch 99 through OR gate 98 and the single-shot multivibrator 102 provides another 3.3-microsecond MRMU1 signal when the left boundary is reached. However, if the timing mark is not encountered on the next scan-left, indicating that the top of the timing mark has been reached, vertical tracking latch 99 is not set on a scan-left. Then when the left boundary is reached and input LBLA goes up, the allow latch up latch 103 is set through AND gate 105. Since allow up latch 103 is set, its output NAU is down, so that the output of AND gate 101 is down and no MRMU1 output is provided from single-shot multivibrator 102.

An up latch 106 is held reset by OR gate 107 when output NAU of allow up latch 103 is up. But now that the allow up latch is set its output NAU goes down and up latch 106 is set by AND gate 108 since the inputs BD and VCLA to AND gate 108 are both up. When the up latch 106 is set, its output MRMU4 goes up, commanding the beam to move up at a rate of 4,000 inches per second. Nothing further happens in the vertical scan circuitry 24 until the beam reaches the bottom of zone A, i.e. the timing level. When the beam reaches the bottom of lower sector A, input LST to AND gate 109 goes up. At this time, the beam is moving right so that MRMR4 input to AND gate 109 is up. Also at this time, input LBLA is down so that the input to AND gate 109 from NOT gate 110 is up. Thus, the output of AND gate 109 goes up when the beam reaches the bottom of zone A and the up latch 106 is reset through OR gate 107. When the up latch 106 is reset its output MRMU4 goes down, which causes the beam to cease scanning up.

When the beam reaches the right boundary, input BD to AND gate 108 goes up causing up latch 106 to be set again. The reset input to up latch 106 has been removed at this time because the beam is not moving right and input MRMR4 to AND gate 109 is not up. When up latch 106 is set its output MRMU4 goes up again, commanding the beam to start moving up again. The beam moves up until the left boundary is reached at which time input LBLA goes up again causing the up latch 106 to be reset. Then the beam does not begin moving up again until the right boundary is reached and up latch 106 is set again.

The same sequence of events occurs in vertical scan circuitry 24 as the beam is scanning up; that is, output MRMU4 is up after arriving at the left boundary until the beam enters a lower sector. When the beam enters a lower sector output MRMU4 is down until the right boundary is reached at which time output MRMU4 goes up again. Output MRMU4 stays up until the left boundary is reached, and so on.

During a scan-up, before the beam arrives at the top of zone M, input ALM into NOT gate 110 is down. Therefore, the output of NOT gate 110 into a reset input of an above level 12 latch 111 is down, which causes above level 12 latch to be reset. When the beam reaches the upper boundary limit input AL 12 goes up, causing above level 12 latch to be set and output AL 12 LA of above level 12 latch 111 to go up. When AL 12 LA goes up, up latch 106 is reset through OR gate 107, inhibiting further beam travel up. The output AL 12 LA of above level 12 latch 111 also forms an input to an AND gate 112. The AND gate 112 also has signal RBLA as an input. Thus, when the beam is above level 12 and at the right boundary so that AL 12 LA and RVLA are up, the output initiate down sweep IDS of AND gate 112 is up. When IDS goes up, the vertical control latch 97 is reset through OR gate 113. Output VCLA of vertical control control latch 97 goes down which prevents up latch 106 from being set again. When the vertical control latch 97 is reset input NVCLA to AND gate 113 goes up. The beam is at the right boundary at this time so that input BD to AND gate 113 is up, causing down latch 114 to be set. When down latch 114 is set, its output MRMD4 goes up, commanding the beam to move down. The beam continues to move down until it reaches the top of lower sector M. At this time, input LST to AND gate 115 goes up. The input to AND gate 115 from NOT gate 116 is also up at this time since the RVLA input to NOT gate 116 is down. Also at this time, the MRML4 input to gate 115 is up since the beam is moving left. Thus, when the LST input to AND gate 115 goes up, signalling that a lower sector has been encountered, the output of AND gate 115 goes up. The output of AND gate 115 is connected to the reset terminal of down latch 114 through OR gate 117. Thus, when a lower sector is encountered down latch 114 is reset. Nothing further happens until the beam reaches the left boundary at which time input BD to AND gate 113 goes up again, causing the output of AND gate 113 to set down latch 114. Output MRMD4 of down latch 114 goes up again and the beam begins scanning down again. Down latch 114 continues to remain set until the next lower sector is encountered and input LST to AND gate 115 goes up, causing down latch 114 to be reset. Down latch 114 continues to be set and reset in the above manner until when the beam arrives at lower sector A and is at the left boundary so that LBLA is up down latch 114 is again set by AND gate 113 as before. The beam then scans down but the scan-down is not stopped at the bottom of zone A as was the case when the beam encountered the bottom of the other lettered zones on the scan-down. This occurs because when the beam arrives at the bottom of zone A input MRML4 to AND gate 115 is not up. Therefore, down latch 114 is not reset as it was when scanning down through the other lettered zones. The down latch continues to remain set and the beam continues to scan-down until input MREDSS goes up, signalling that the beam has reached a specified distance below the top of the timing mark. When MREDSS input to OR gate 117 goes up, down latch 114 is reset and the scan down ceases. The MREDSS input is also connected to and serves to reset timing latch 96 and allow up latch 103. The OR gate 149 in FIG. 9 is used to generate a signal UOD which is up whenever the beam is scanning up or down.

When timing latch 96 is reset its output TLA TO NOT gate 118 goes down so that the output from NOT gate 118 to AND gate 119 goes up. Since the down latch 114 is reset at this point, its output MRMD4 to NOT gate 120 is down so that the output from NOT gate 120 to AND gate 119 is up. The output of AND gate 119 therefore goes up. The output of AND gate 119 is connected to a single-shot multivibrator 121. The letter P on the input to this single-shot multivibrator indicates that it is only responsive to a positive, i.e. 0 to 1 transition. Thus, when the output of AND gate 119 goes up, single-shot multivibrator 121 provides the blanking output BLA which is up for 30 microseconds. The output BLA is connected to a NOT gate 95 which, in turn has its output connected to AND gate 92. The function of the signal BLA is to prevent the vertical scan circuitry from recognizing and responding to the timing mark for the column just scanned. The beam therefore continues scanning left until the next timing mark is encountered which will be more than 30 microseconds later and operation of the vertical scan circuitry proceeds as described before.

Figure 10:
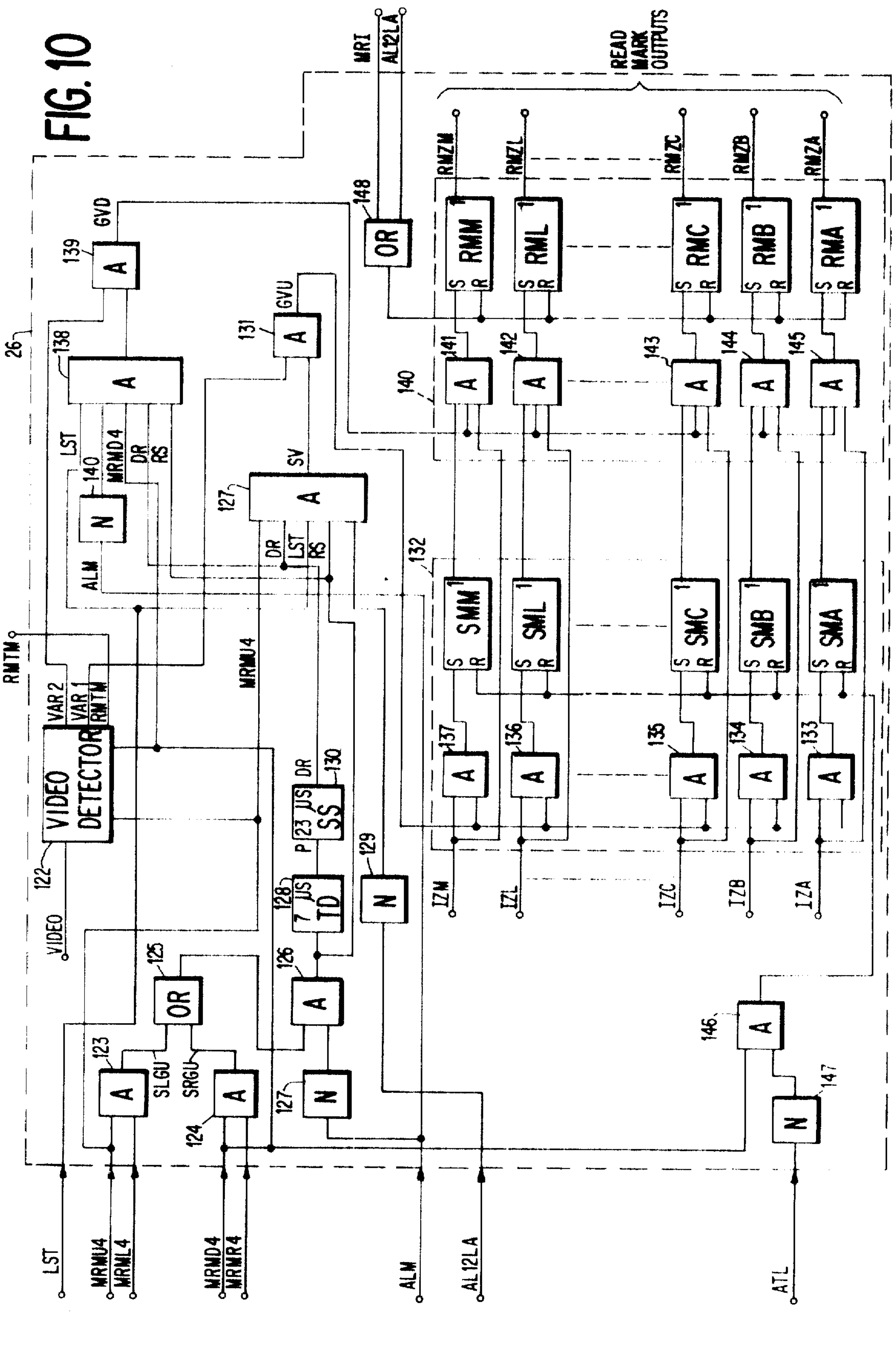
FIG. 10 is a logic block diagram of the video detection, storage and gating circuitry of FIG. 4.

A logic block diagram of the video detection, storage and gating circuitry 26 of FIG. 4 is shown in FIG. 10. In FIG. 10, a video detector 122 has an input VIDEO from the photomultiplier tube 8 of FIG. 3. Video detector 122 also has inputs MRMU4 and MRMD4 which indicate whether the beam is moving up or down, respectively. When the beam is moving up and video detector 122 detects VIDEO above a first reference level, it provides an output VAR 1. When the beam is moving down and the video detector 122 detects VIDEO above a second reference level, it provides an output VAR 2. Output RMTM of video detector 122 goes up when a timing mark is detected.

When the beam is moving up and to the left, which will only occur during a recognition scan, inputs MRMU4 and MRML4 to AND gate 123 will both be up, causing output SLGU of AND gate 123 to go up which indicates that the beam is sweeping left going up. In the same manner, when the beam is going down and to the right which will only occur during a recognition sweep, inputs MRMD4 and MRMR4 to AND gate 124 will both be up, causing the output SRGD of AND gate 124 to be up which indicates that the beam is sweeping right going down. The outputs SLGU and SRGD of AND gates 123 and 124 form the inputs to an OR gate 124. The output of OR gate 125 is an input to AND gate 126. AND gate 126 also receives as an input the output of a NOT gate 127. The input to NOT gate 127 is signal ALM which is only up when the beam is above level M. Thus, ALM will be down during a recognition scan and the output RS of AND gate 126 will thus be up during a recognition scan. The output RS of AND gate 126 is connected to an AND gate 127 and to a 7-microsecond time delay 128. Other inputs to AND gate 127 include MRMU4 which is up when the beam is scanning up, LST which is up when the beam is in a lower sector, a delay recognition signal DR from the output of a single-shot multivibrator 130, and the output of a NOT gate 129. The input to NOT gate 129, is signal AL 12 LA which is up whenever the beam is above level 12. Therefore, during all recognition scans up the input to AND gate 127 from NOT gate 129 will be up. At the beginning of a recognition scan, the only input to AND gate 127 which is not up is the delay recognition DR input.

The DR input goes up 7 microseconds after the beginning of a recognition scan is only up for 23 microseconds thereafter. At the beginning of a recognition scan input RS to 7-microsecond time delay 128 goes up. The output of time delay 128 goes up 7 microseconds later. When the output of time delay 128 goes up, a positive transition occurs at the input to single-shot multivibrator 130. Single-shot multivibrator 130 then provides an output DR which is up for 23 microseconds. When DR goes up the store video output SV of AND gate 126 goes up. The SV signal is an input to an AND gate 131. The remaining input of AND gate 131 is VAR 1 from video detector 122. Thus, when video detector 122 detects video above a first reference level on a scan-up and the SV input is up, the good video up output GVU of AND gate 131 goes up.

Output GVU of AND gate 113 is connected to storage circuitry 132. Storage circuitry 132 also has 12 inputs IZA through IZM which are up when the beam is in zones A through M, respectively. Only 5 of these inputs are shown in FIG. 10, but it should be understood that there are 12, one for each lettered zone.

Operation of storage circuitry 132 is as follow: When, for example, the beam is scanning zone A and video above the first reference is detected by video detector 122, signal lines IZA and GVU will both be up so that the output of an AND gate 133 goes up. When this occurs latch SMA to which the output of AND gate 133 is connected is set. Similarly, when the beam is in zone B and good video is detected, the output of AND gate 134 goes up, setting latch SMB. AND gates 135 and 136 and 137 function in a similar manner to set latches SMC, SML, and SMM when good video is detected in zones C, L, and M, respectively. Although only the AND gates and latches for zones A, B, C, L and M are shown in FIG. 10, it should be understood that there are corresponding AND gates and latches (not shown) for each of the lettered zones. Thus, storage circuitry 132 operates to store an indication of those mark areas in which a good video signal is detected on a scan-up.

During a scan-down, AND gates 138 and 139 and NOT gate 140 function is a manner similar to AND gates 127 and 131 and NOT gate 129 to provide a good video down GVD output when video above a second reference level is detected on a scan-down. More specifically, inputs to AND gate 138 are identical to the AND gate 127 except that the MRMU4 input to AND gate 127 is replaced by an MRMD4 input to AND gate 138. Thus, the output of AND gate 138 goes up 7 microseconds after the beam enters a recognition scan and stays up for 23 microseconds. When video detector 122 detects a video above a second reference level, its output VAR 2 is up. Thus, when good video is detected during the 23-microsecond window of a recognition scan, the output GVD of AND gate 139 goes up.

It should be pointed out at this time that the first and second video levels established in video detector 122 may be either the same or different. For example, output VAR 1 of video detector 122 may be caused to go positive when video of a first level, say 2 volts, is detected; whereas output VAR 2 of video detector 122 may only go positive when video of a different level, say 3 volts, is detected. Details of video detector 122 are not shown since suitable circuitry is well known in the art. For example, video detector 122 could consist of merely a series of voltage discriminators. If desired, video detector 122 could also be used to establish a clipping level. For example, the maximum video sensed on a scan-up could be stored. A predetermined percentage of this maximum video sensed on a scan-up might establish a clipping level so that output VAR 2 goes up only if video above the clipping level is sensed. Storage could easily be accomplished by using a capacitor in combination with voltage discriminators. At any rate, it should be understood that the first and second reference levels established by video detector 122 may be the same or may be different.

When video above the second reference level is detected on a scan-down, the output GVD of AND gate 139 goes up, as described before. Output GVD is connected to read mark circuitry 140. Read mark circuitry 140 also has 24 other inputs. Twelve of these inputs are signals IZA through IZM which are up when the beam is in zones A through M respectively. The other 12 inputs are the outputs of store mark latches SMA through SMM which go up when a mark is detected in zones A through M, respectively, on the scan-up.

Read mark circuitry 140 operates in the following manner:

When, for example a mark is detected in zone M on the scan-down, so that inputs GVD and IZM to AND gate 141 are both up, the output of AND gate 141 will only go up if a mark was detected in zone M on the scan-up and store mark latch SMM was set. If a mark in zone M was detected on the scan-up and a mark is detected in zone M on the scan-down, the output of AND gate 141 will go up, setting read mark latch RMM. When read mark latch RMM is set, its output RMZM goes up. AND gates 142, 143, 144 and 145 operate in a similar manner to set read mark latches RML, RMC, RMB and RMA when a mark is detected in each of their respective zones on a scan-down if a mark was also detected in those respective zones on the scan-up. Only five of the read mark latches RMM through RMA with their associated AND gates 141 through 145 are shown in FIG. 10. It should be understood, however, that there are a total of 12 read mark latches and associated AND gates which provide 12 read mark outputs RMZA through RMZB. These read mark outputs may be connected to any variety of digital-information-sensing device but typically are connected to a central processing unit.

The store mark latches SMA through SMM are reset by AND gate 146 and NOT gate 147 whenever the beam is moving down and passes below the timing level so that MRMD 4 is up and ATL is down. The read mark latches RMA through RMM are reset by OR gate 148 in response to a mark read initiate signal or when the beam is moving up and goes above level 12 so that respectively either MR1 is up or AL 12 LA is up.

While the invention has been particularly shown and described with reference to a preferred embodiment thereof, it will be understood by those skilled in the art that various changes in form and details may be made therein without departing from the spirit and scope of the invention.

What we claim is:

1. A method of optically scanning a document having a plurality of mark areas within a mark which may or may not exist, comprising the steps of:

a. scanning different portions of each mark area during a plurality of scans;

b. indicating for each scan those mark areas in which marks are detected, and c. generating an output for each mark area in which a mark is detected during a predetermined number of said plurality of scans.

2. In an optical system including scanning and detection means for reading marks on a document which has a plurality of mark areas within which a mark may or may not exist, improved noise rejection means comprising:

a. means for scanning different portions of each of the mark areas during a plurality of scans;

b. means associated with each mark area for indicating that a mark is detected during a scan; and c. means associated with each mark areas and coupled to the indicating means for generating an output when a mark is detected on a specified number of said scans.

3. In a optical system including scanning and detection means for reading marks on a document which has a plurality of mark areas within which a mark may or may not exist, improved noise rejection means comprising:

a. scanning means for scanning a first portion of each of the mark areas during a first scan and a second portion of each of the mark areas during a second scan;

b. first generating means associated with each mark area for generating and storing a first indication that a mark is detected in that mark area during said first scan;

c. second generating means associated with each mark area for generating a second indication that a mark is detected in that mark area during said second scan; and d. means associated with each mark area and responsive to the presence of both said first and said second indications to generate an output.

4. The system of claim 3 in which said first generating means comprises a plurality of storage latches, one for each mark area.

5. The system of claim 3 in which said scanning means comprises:

a. a scanner having vertical and horizontal inputs adapted to receive signals controlling, respectively, vertical and horizontal scanning of said scanner;

b. means connected to said vertical inputs for generating signals commanding said scanner to scan the mark areas at a first vertical velocity during both said first and said second scans;

c. means connected to said horizontal inputs for generating signals commanding said scanner to scan the mark areas at a first horizontal velocity during both said first and said second scans; and d. means connected to said horizontal inputs for generating signals commanding said scanner to scan portions of the mark areas at a second horizontal velocity during said first and said second scans, whereby different portions of each mark area are scanned during said first and said second scans.

UNITED STATES PATENT OFFICE
CERTIFICATE OF CORRECTION

Patent No. 3,596,063 Dated July 27, 1971

Inventor(s) Terry W. Curtis, Robert D. Keillor and Donald L. Mehaffey

It is certified that error appears in the above-identified patent and that said Letters Patent are hereby corrected as shown below:

Col. 2, line 74 - delete "scan" between "The" and "beam"
Col. 6, line 1 - "on the scan" should be "on a scan"
Col. 7, lines 15-19 - delete sentence "When, however,...timing mark." and substitute therefor - "When, however, the beam reaches a prescribed distance below the timing mark, signal BTTM of vertical boundary generation circuitry 22 goes up, indicating that the beam is a prescribed distance below the top of the timing mark."
Col. 8, line 54 - delete "sown" and insert "shown"
Col. 10, line 44 - "1 to O" should be "1 to 0"
line 50 - "O" should be "0"
Col. 11, line 27 - delete "TO" after "LST"
line 32 - "O" should be "0"
line 61 - "TC and" should be "TC of"
Col. 12, line 24 - delete "latch" after "allow" (first occurrence)
Col. 13, line 52 - "To" should be "to"
Col. 14, line 19 - "OR gate 124" should be "OR gate 125"
line 32 - delete comma (,) after "gate 129"
line 39 - insert "and" after "scan"
line 46 - "AND gate 126" should be "AND gate 127"
line 52 - "AND gate 113" should be "AND gate 131"
Col. 16, line 2 - "MR1" should be "MRI"
line 11 - insert "which" after "within"
line 28 - delete "areas" and substitute "area"

Signed and sealed this 29th day of August 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334